106. COMPOSITIONS, COATING OR PLASTIC.

89

Patented Jan. 1, 1935

1,986,335

*Prehydrated cement*

UNITED STATES PATENT OFFICE 1,986,335

HYDRAULIC AND SIMILAR CEMENT

Karl Halbach, Dusseldorf, Germany

No Drawing. Application September 25, 1933, Serial No. 690,941. In Germany June 11, 1932

11 Claims. (Cl. 106—24)

This invention relates to hydraulic cements and structures produced with cement.

One object of the invention is to provide a process for the production of new or improved hydraulic cements which have application for various purposes and particularly for street and road making and thus for the building of so-called macadamized roads as well as for roadways of a concrete-like structure.

A further object of the invention is the provision of special measures for the working up of these new or improved cements, or of already known cements with similar qualities, in the making of the aforesaid road coverings or surfaces.

The known kinds of mortar or matrix made from Portland cement, blast-furnace cement, slag cement, blast-furnace slag, highly hydraulic limes and the like, exhibit a ratio between tensile strength and compressive strength of about 1:10 to 1:20. These mortars therefore possess a low tensile strength in comparison with their compressive strength. This phenomenon is, however, the cause of cracks in the mortar when set. Moreover, the mortars mentioned have the property that they set comparatively quickly and during this setting must not be exposed to shocks or concussions.

For the most varied structural purposes, these circumstances frequently entail a considerable disadvantage. This applies particularly to street and road making. An important object of the invention, therefore, is to provide a hydraulic cement which will in a large measure eliminate these drawbacks.

According to the invention, Portland cement, blast-furnace cement, slag cement or other hydraulic materials or latent hydraulic substances to be used in the manufacture of hydraulic cements are subjected to a hydrating by slurrying with water in such a way that a material of a gel-like nature results. This slurrying process will be hereinafter referred to as hydrating or hydration and can be carried out in various ways. The hydrated product is mixed with fresh cement and then yields a cement or matrix for which the ratio between the tensile and compressive strengths is no longer from 1:10 to 1:20 but somewhere about 1:6. The absolute compressive strength is thus reduced in comparison with cement. The mortar also sets very slowly. The attainable ratio between tensile and compressive resistance and the length of time taken for setting, may, of course, have other values, dependent upon the extent of the hydrating effected and the proportion of fresh cement. It is of great importance, however, that the matrix shall be insensitive to shocks or concussions during the setting period, in comparison with the aforesaid known matrices.

These fundamental qualities of the new hydraulic cement have a far-reaching significance for street and road making and for all other building purposes, in which it is of less importance to have a high degree of compressive strength than a certain elasticity of the cement or matrix and a longer setting period for the convenient carrying out of all necessary or expedient structural measures and in which the mortar may be exposed to concussion or shocks during the setting.

If this cement is made use of for example, in macadamized road construction, the result is that the customary and comparatively lengthy rolling of the rubble-structure can also be carried out in that case. The shocks or concussions arising do not interfere with the setting of the mortar. With comparatively little mortar, however, a well-wedged road covering which is powerfully anchored to the bed, can be made with a firm and smooth surface which is insensitive to weather influences. The favourable ratio between tensile and compressive resistances is a warrant that cracks will hardly arise.

The hydrating of the cement by slurrying with water can be effected by measures which are in themselves known and with the aid of known machines or appliances, for example by mechanical movement, by blowing in air and such like. In this way, the slurries are continuously or temporarily kept in motion, in order to avoid a premature conglomeration or hardening of the material.

The production of masses of gel-like character can be accelerated by subjecting the initial materials intended for hydration to heat treatment. For example, instead of water, steam can be used, or else steam together with water which has been warmed, or simply warm water can be used.

The gel formation can also be promoted by supplying carbon dioxide or other suitable chemical substances such, for example, as hydrochloric acid or sulphuric acid of high dilution.

In accordance with the invention, the mass of gel-like nature made in this way, is dried and more or less ground up. To this product, untreated Portland cement, blast-furnace cement or the like, gypsum or other regulating substances are added. The grinding of the gel-like intermediate product can take place with the admixture of cement or cement clinker and therefore simultaneously for all components of the finished product.

The following directions are given as a practical example for the production of the new cement:—

50 parts of Portland cement are mixed by mechanical means with 50 to 100 parts of water in a vessel until a mass of gel-like character is obtained. It has been established that even a considerably greater addition of water does not result in a deterioration worth mentioning. This mass is then dried, either by natural air drying or artificial drying in a known drying installation in order that it may then be ground. This product can thereupon be mixed for instance with Portland cement in equal parts.

If matters are carried out in this way, a cement or matrix is obtained which, after 28 days, has a compressive strength of about 325 kg. and a tensile strength of about 54 kg., that is a ratio of 1:6 between tensile and compressive strength. The setting of this cement begins after about four hours and is complete after about ten hours.

The favourable proportion sought after between tensile and compressive strength with retention of the insensitiveness to shocks during the period of setting and first hardening can, according to the invention be further improved by the selection of suitable additions to the cement. In accordance with the invention, these additional substances consist of hydraulic materials, for example limestone, but especially cement clinkers, which owing to their chemical properties lead to an additional consolidation of the road surface which in being made can be rolled with advantage.

Hitherto broken up or ground clinker has been proposed as an additional material for concrete structures, in order either to attain a greater capacity for resistance against aggressive water or to obtain as high absolute compressive and tensile strength as possible. In the present instance, the addition of hydraulic materials, for example limestone and in particular cement clinkers, in combination with the particularly insensitive mortar, has the object of making the ratio between the attainable compressive and tensile strengths still more favourable in the sense already mentioned.

If the cement, mentioned in the above practical example, consisting of 50 per cent of hydrated cement and 50 per cent of fresh cement is mixed with cement clinkers in the proportion of 1:2, then after 28 days a compressive strength of about 475 kg. and a tensile strength of about 91 kg. is obtained. In this instance, there is therefore a ratio of about 1:5 between the tensile and compressive strengths, that is to say a mortar is obtained which plainly shows extraordinarily improved properties for road making.

Mortars are already known, as for example, trass-lime mortar, trass-lime-cement mortar and bituminous mortars, which are to a certain degree insensitive towards shocks or concussion during setting and accordingly in this respect show similar properties to those possessed by the hydrated mortar proposed according to the present invention. With these known mortars, it is also possible, by the addition of hydraulic substances, and in particular cement clinkers, to obtain a particularly favourable ratio between the compressive and tensile strengths. The present invention therefore extends also to the measure of admixing these additional substances to these known mortars, which are insensitive to shocks during setting.

By the use of hydrated mortars or of all hydraulic mortars behaving similarly, as for example trass-lime mortar, trass-lime-cement mortar or the like, it is precisely possible in road making to attain effects leading to hitherto unknown technical and economic improvements. This applies particularly to the making of roads of a concrete-like structure. It has been established that road coverings made from such mortars can be compressed or compacted by rolling, stamping or the like prior to or during or solely during setting. With roads of a concrete-like structure, there is no internal structural arrangement, such as is formed in the case of macadamized road construction, for example by the internal wedging of the rubble or broken stone. In the case of the concrete composition, small and fairly rounded stone material is generally made use of as an addition which is completely surrounded by the mortar. Under such circumstances, therefore, no definite limit is set to the compression of the road covering, as is the case with macadamized roads on attaining the firm wedging of the rubble covering. With road surfaces of a concrete-like structure it is therefore possible, according to the invention, to condense the masses of mortar in a large measure in correspondence with the weight of the roller. This rolling process can be extended over a considerable period of time, especially during the setting and first hardening period. In this way it is possible to obtain a comparatively thin road covering, which applies itself well to the road bed and owing to its elasticity meets all requirements and particularly also is proof against all weather influences. This compressing of the road covering is only possible because mortars are used which are insensitive to concussions during setting. The rolling of the road surface is recommended precisely during the setting to a point of time when the mortar has already begun to set firm, because under this condition the masses of mortar oppose a greater resistance to flowing under the pressure of the roller. The attainment of an even surface of the road covering is thereby facilitated.

In the production of such road surfaces, it is possible to proceed by first making a layer of about 10 cm. thickness on the road-bed. After the compression of this layer has taken place, a further layer is produced in the same way, until the desired thickness of the total layer is attained. It is advisable in filling out the upper surface of the road at once to make use of broken up or ground clinker or the like as an additional material in the mortar. The use of a particularly tenacious elastic zone in the covering layer of the road is calculated to avoid the drawbacks which have hitherto presented themselves in concrete road construction, such as the preparation of joints, the occurrence of cracks, and the like.

In all the applications in road making that have been described, it is unnecessary, owing to the peculiarity of the mortar, to shut off traffic.

I claim:—

1. Process for the production of a hydraulic cement particularly intended for macadamized or concrete-like street and road construction, comprising subjecting hydraulic or latent hydraulic substance to a hydrating treatment to produce a mass of gel-like character, drying said mass and grinding the same.

2. Process for the production of a hydraulic cement material particularly intended for macadamized or concrete-like street and road construction, comprising subjecting hydraulic or latent hydraulic substance to a hydrating treatment to produce a mass of gel-like character, drying and grinding said mass, and adding thereto a regulating or aggregating substance.

3. Process for the production of a hydraulic cement material particularly intended for macadamized or concrete-like street and road construction, comprising subjecting hydraulic or latent hydraulic substance to a hydrating treatment to produce a mass of gel-like character, drying the mass and grinding the intermediate product simultaneously with the addition of a regulating or hydraulic substance.

4. Process for the production of a hydraulic cement material particularly intended for macadamized or concrete-like street and road construction, comprising subjecting hydraulic or latent hydraulic substance to a hydrating treatment to produce a mass of gel-like character, drying the mass, grinding the same, and adding a material of the class including fresh cement, cement clinkers and the like.

5. Process for the production of cement comprising the preparation of a mass of gel-like character by subjecting hydraulic or latent hydraulic substance to a hydrating treatment and the addition of a regulating or hydraulic substance such preparation and addition being intercalated in suitable intermediate stages in the production of the cement.

6. As a new article of manufacture, a cement composition comprising fresh cement and a cement material produced by subjecting hydraulic or latent hydraulic substance to a hydrating treatment, and subsequently drying the same.

7. The process of preparing a hydraulic cement, the ratio of the tensile to compressive strengths of which is approximately 1:6, and which forms a mortar which is not sensitive to shocks during setting, which comprises the steps of hydrating ordinary Portland cement or the like to a gel-like consistency, then drying, grinding, and mixing with fresh untreated cement.

8. The process of preparing a hydraulic cement, the ratio of the tensile to compressive strengths of which is approximately 1:6, and which forms a mortar which is not sensitive to shocks during setting, which comprises the steps of hydrating ordinary Portland cement or the like to a gel-like consistency with the application of heat then drying, grinding, and mixing with fresh untreated cement.

9. The process of preparing a hydraulic cement, the ratio of the tensile to compressive strengths of which is approximately 1:6, and which forms a motar which is not sensitive to shocks during setting, which comprises the steps of hydrating ordinary Portland cement or the like to a gel-like consistency while treating with carbon dioxide, then drying, grinding, and mixing with fresh untreated cement.

10. The process of preparing a hydraulic cement, the ratio of the tensile to compressive strengths of which is approximately 1:6, and which forms a mortar which is not sensitive to shocks during setting, which comprises the steps of hydrating ordinary Portland cement or the like to a gel-like consistency with the addition of a dilute inorganic acid, then drying, grinding, and mixing with fresh untreated cement.

11. A cement having a ratio between its tensile and compressive strengths of approximately 1:5 to 1:6, and comprising a mixture of a quantity of fresh hydraulic material with a ground, dry, gel-like hydrated cement.

KARL HALBACH.